No. 858,817. PATENTED JULY 2, 1907.
E. L. MORGAN.
SPRING WHEEL.
APPLICATION FILED NOV. 26, 1906.
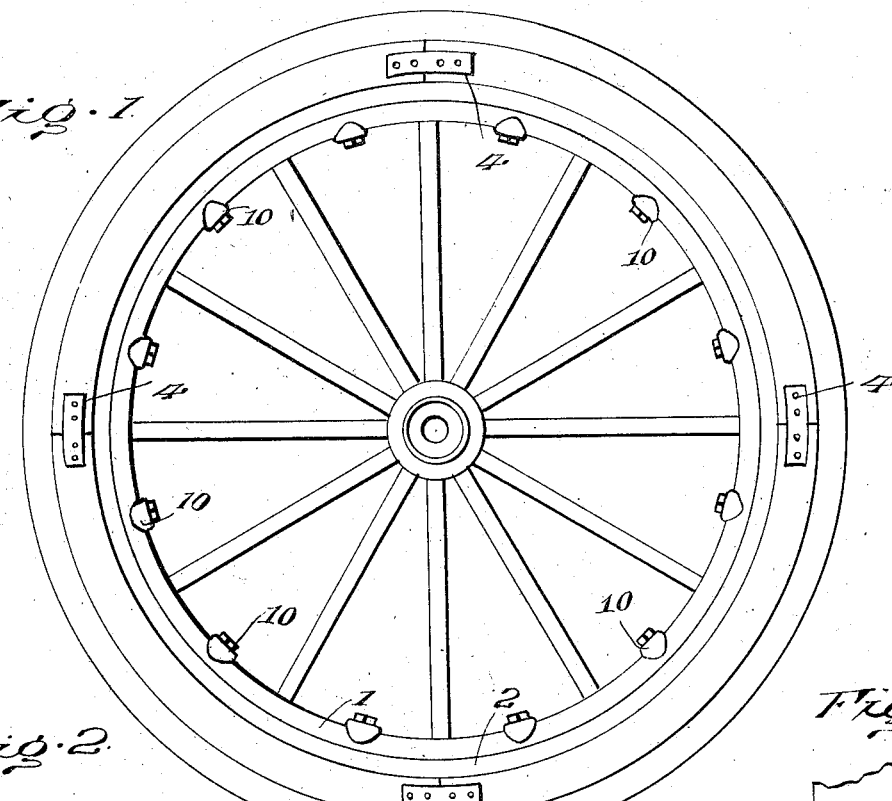
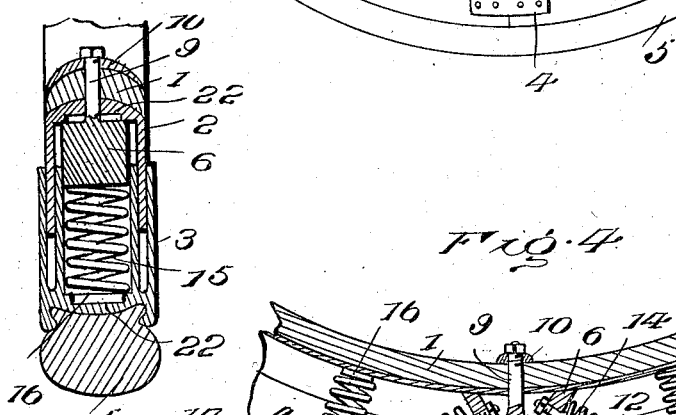
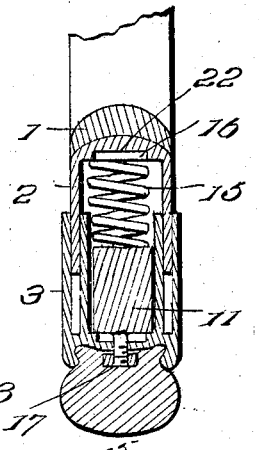
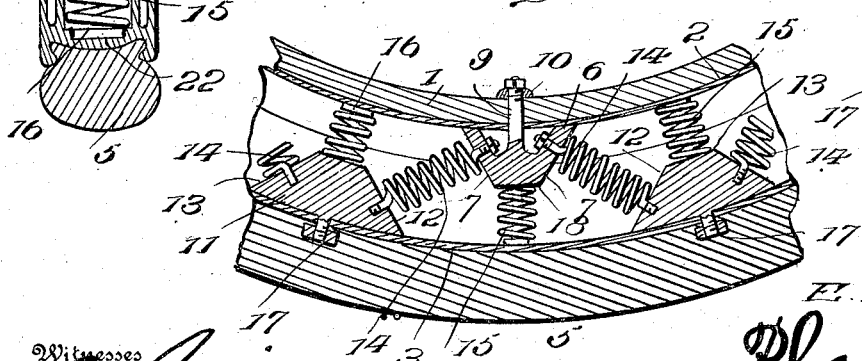
Inventor
E. L. Morgan
Witnesses
Attorneys

UNITED STATES PATENT OFFICE.

EARL L. MORGAN, OF ST. LOUIS, MISSOURI.

SPRING-WHEEL.

No. 858,817.     Specification of Letters Patent.     Patented July 2, 1907.

Application filed November 26, 1906. Serial No. 345,111.

To all whom it may concern:

Be it known that I, EARL L. MORGAN, a citizen of the United States, residing at St. Louis, State of Missouri, have invented certain new and useful Improvements in Spring-Wheels, of which the following is a specification.

This invention contemplates certain new and useful improvements in that class of spring wheels in which the resiliency is effected by means of springs permitting a slight circumferential movement to the tread of the wheel with respect to the hub as well as a radial movement, and the object of my invention is to provide a simple and durable construction of spring tire of this type which will be composed of comparatively few and simple parts that may readily be assembled.

With this and other objects in view as will more fully appear as the description proceeds, the invention consists in certain constructions and arrangement of parts hereinafter described and claimed.

For a full understanding of the invention and the merits thereof and also to acquire a knowledge of the details of construction of the means for effecting the result, reference is to be had to the following description and accompanying drawings, in which:

Figure 1 is a side elevation of a spring wheel embodying the improvements of my invention; Figs. 2 and 3 are transverse sectional views of the wheel rim taken along different lines. Fig. 4 is a longitudinal sectional view of a portion of the rim.

Corresponding and like parts are referred to in the following description and indicated in all the views of the drawings by the same reference characters.

Referring to the drawings, the numeral 1 designates the felly of a wheel, said felly being preferably slightly dished in cross section and being adapted to receive the inner section of my improved spring tire.

My tire comprises an inner section 2 which is U-shaped in cross section as shown with its two edges facing outwardly, and a complemental U-shaped outer part 3, the side members of which embrace and are adapted to slide radially upon the side members of the inner section 2. The outer sections 3 may be made in separable parts connected together in any suitable manner when they are placed around the inner section, side clamping plates and bolts 4 being shown in the present instance for this purpose. The outer section 3 is adapted to have secured to it a solid rubber cushion 5 which forms the tread of the wheel, this cushion being provided so as to render the tread noiseless, because I depend upon the springs between the two sections of the tire for the resiliency thereof.

Mounted within the inner section 2 is a semicircular series of trapezoidal blocks 6, the bases of which lie against the innermost wall of said section and the side edges of which converge or taper outwardly as indicated at 7, towards the flat outer face 8. These blocks 6 are preferably secured to the inner section 2 by means of bolts, the shanks 9 of which are preferably integral with the blocks and extend through the inner side of the section 2 and also through the felly 1 and are provided on their inwardly projecting ends with crescent shaped clamps 10 which fit snugly around the inner side or face of the felly and are held on the shanks and against the face of the felly by means of nuts screwed on the shanks of the bolts as shown. By this means, not only are the blocks 6 secured rigidly to the innermost tire section 2, but the latter in turn is connected rigidly to the felly of the wheel. 11 designates blocks of another circular series these latter being arranged within the outer section 3 of the tire and alternating with the blocks 6, as shown. The blocks 11 correspond substantially in shape to the blocks 6, having inwardly converging side edges 12 and flat inner faces 13, the complemental beveled or inclined faces 12 and 7 of the respective inner and outer blocks being substantially parallel as shown. Between every two adjacent blocks is mounted a coil spring 14, the ends of which bear against the complemental inclined edges 12 and 7 of the respective blocks and which are secured to the respective blocks in the present instance by having their inwardly projecting ends screwed in the inner blocks, while their opposite ends project through the outer blocks and are secured therein by means of countersunk nuts, as illustrated in the drawings. By this arrangement, it will be seen that there is provided for the two sections of the tire, a series of inclined springs in which one spring extends first in one direction obliquely and the next spring in an opposite direction obliquely. Between the inclined springs are other helical or coil springs 15 which project radially as shown, and one end of each of these springs 15 is screwed into one face of a block 11 or 6, while the opposite end of each spring 15 is provided with a disk 16 which fits within a groove 22 in the wall of the respective rim sections, but is not secured to the sections except by frictional contact. Hence each one of the springs 15 may slip along the inner section at its inner end when they are at the front and rear of the wheel as the same is turning, so as to interfere in no wise with the proper circumferential resiliency of the springs 14 at such points, while whenever the springs 15 are at the top or bottom of the wheel, they will produce the necessary resiliency by a direct thrust of the tire, with respect to the inner section. The outer series of blocks 11 are preferably secured rigidly in place by means of short bolts, the shanks 17 of which are preferably integral with said blocks and project through the outer wall of the outer section 3, being secured in place by means of nuts as shown.

From the foregoing description in connection with the accompanying drawing, it is obvious that the outer section 3 of the tire will have resiliency along a radial line, as well as circumferential, by means of the two sets of springs, the radial set 15 permitting the radial yielding movement, and the oppositely inclined series of springs 14 which alternates with the springs 15 permitting the other yielding movement. As shown in the drawing, the outer U-shaped section 3 has doubled spaced apart side walls which receive between them the complemental side walls of the inner section 2, this construction readily permitting of the sliding movement of one section with respect to the other, but at the same time affording a strong and durable structure.

Having thus described the invention, what is claimed as new is:

1. A wheel tire, comprising inner and outer rims, a series of bearing blocks secured within the inner rim, another series of bearing blocks secured within the outer rim, and alternating with the blocks of the inner series, the said blocks having oppositely facing inclined edges, coil springs interposed between and secured to the blocks at the oppositely inclined edges thereof and producing a semicircular series of springs of which a spring is inclined first in one direction and the next adjacent in the opposite direction, and a second series of coil springs interposed between the blocks of the outer series and the inner section of the tire.

2. A wheel tire, comprising inner and outer rims, a series of bearing blocks secured within the inner rim, another series of bearing blocks secured within the outer rim, and alternating with the blocks of the inner series, the said blocks having oppositely facing inclined edges, coil springs interposed between and secured to the blocks at the oppositely inclined edges thereof and producing a semicircular series of springs of which a spring is inclined first in one direction and the next adjacent in the opposite direction, and a second series of coil springs interposed between the blocks of the outer series and the inner section of the tire, the last named springs being secured to the blocks of the outer series and being free to slide circumferentially, with frictional engagement, against the inner wall of the inner section of the tire.

3. A tire, comprising an inner U-shaped section and an outer U-shaped section, the two sections being mounted to slide one upon the other, a series of trapezoidal blocks secured within the inner section, a series of oppositely disposed blocks of corresponding form secured within the outer section, the blocks of one series alternating with the blocks of the other series in a staggered arrangement, springs secured between the inclined faces of the blocks of the two series, and other springs interposed between the blocks and extending radially in opposite directions toward the inner and outer sections, respectively.

4. A tire, comprising an inner and an outer section, bearing blocks mounted within the inner section and provided with bolts extending through the inner rim and adapted to extend through the felly of a wheel, clamping plates mounted on said bolts and adapted to abut against the inner face of a wheel felly, means for securing said plates in place, another series of bearing blocks secured within the outer section, springs interposed between the blocks of one series and the blocks of the other series, and other springs interposed between the said blocks and extending radially into contact with the rim sections.

In testimony whereof I affix my signature in presence of two witnesses.

EARL L. MORGAN. [L. S.]

Witnesses:
LEO F. MILES,
THOMAS W. BARRON.